United States Patent [19]
McGuine et al.

[11] Patent Number: 5,708,988
[45] Date of Patent: Jan. 20, 1998

[54] FOOTBALL HELMET ADJUSTMENT SYSTEM

[75] Inventors: Timothy A. McGuine, Sauk City; Steven J. Nass, Lake Mills, both of Wis.

[73] Assignee: Wisconsin Alumni Research Foundation

[21] Appl. No.: 683,921

[22] Filed: Jul. 19, 1996

[51] Int. Cl.⁶ .................................................. A42B 3/00
[52] U.S. Cl. .................... 2/425; 2/417; 2/9; 33/512; 33/2 R
[58] Field of Search .................. 2/410, 424, 425, 2/417, 9, 10, 173, 183; 33/511, 512, 679.1, 562, 2 R; 40/586; 434/251, 270

[56] References Cited

U.S. PATENT DOCUMENTS

| | | | |
|---|---|---|---|
| 1,431,873 | 10/1922 | Clausing | 33/512 |
| 4,290,149 | 9/1981 | Aileo | 2/417 |
| 5,505,002 | 4/1996 | Falco | 33/679.1 |
| 5,584,125 | 12/1996 | Prete | 33/512 |

Primary Examiner—Michael A. Neas
Attorney, Agent, or Firm—Quarles & Brady

[57] ABSTRACT

A football helmet sizing card is described which permits convenient, rapid and efficient sizing and adjustment of football helmets on a football player's head. The card includes indicia which may be used to quickly and efficiently measure spacing of the football helmet from the player's eyebrows to the front rim of the helmet. The card is also sized in width so as to correspond to the manufacturer's recommended spacing distance from the nose to the face mask of the helmet. In this way, the card can be used quickly and efficiently over the course of the season to test for helmet sizing and adjustment, and this is particularly useful with helmets which have adjustable air bladder inflation systems so that appropriate inflation of the bladders can be made during the course of the season as atmospheric conditions warrant.

8 Claims, 3 Drawing Sheets

FOOTBALL HELMET ADJUSTMENT SYSTEM

This application claims priority of provisional application Ser. No. 60/001,266 filed Jul. 20, 1995.

FIELD OF THE INVENTION

The present invention relates to a device and method for use in the sizing or adjustment of football helmets and relates, in particular, to a quick and easy method for testing the adjustment and sizing of a football helmet on a day-to-day basis.

BACKGROUND OF THE INVENTION

In the course of modern scholastic and recreational sports activities, much effort and study has been undertaken to maximize the personal safety of all participants in such sports. In the sport of football, in particular, where the players are subjected to a variety of impacts and contacts, significant effort has been undertaken over time to develop and utilize a variety of safety equipment for the personal protection of the players. One of the most important components of the safety equipment for a football player is the football helmet. Over the course of generations, the complexity and design of football helmets has changed and evolved to try to provide the maximum possible protection for the head of the football player.

The most modern style of football helmet in use at the intercollegiate level of play today is formed of a hard plastic shell corresponding in shape to the user's head. Within the shell there are one or more soft padding portions to generally contact the user's head in a cushioned manner. In addition, the most common helmets used at the level of intercollegiate sports today have two air bladders within them. One air bladder is located at the top of the helmet and the other air bladder surrounds the sides and rear of the helmet. The air bladders are accessible through air pressure fittings located in the top of the helmet and recessed into the shell. The purpose of these air bladders is to allow an adjustable fit of the helmet to the user. By increasing or decreasing the amount of air stored in these bladders, the fit of the helmet can be altered in a way so as to customize the fit of any particular helmet to the shape and size of the wearer's head. Such air inflatable helmets are also widely used at the level of high school interscholastic football.

While the air inflatable helmets are highly advantageous in terms of the flexibility they offer to the player and the equipment manager, they also offer the possibility for significant variation in fit over time. Ambient air pressure, outside of the helmet, changes from time to time during the year. In addition, temperature has an obvious effect on the air pressure of the air contained within the bladders of the helmet. Furthermore, players are prone to change hair styles from time to time, which may make larger or smaller variations in the fit of the helmet on the individual. All of these things will alter the fit between the helmet and the user in a way that may make the helmet not fit in the manner that was intended when the helmet was initially inflated for the football player.

Unfortunately, there exists no previous handy way to measure football helmet fit and sizing on a regular basis. While at the beginning of the season the manager or coach can make a fairly detailed fit of the helmet, and adjust the inflation of the two bladders, to fit the individual's head size and shape, it is often difficult or burdensome to make adjustments to that fit either during the course of the season or even on a particular day. Particularly at the high school level, there may not be designated equipment mangers who have the training and expertise to check helmet size and fit on a regular basis. In fact, studies have been conducted, as discussed below, which indicate that large numbers of helmets of this design are often found to be adjusted in such a manner that they no longer conform to the manufacturer's suggested guidelines for fit during the course of the season.

It is not known whether or not improper adjustment of a helmet relative to the manufacturer's recommendations is or is not a cause, or is in any way related to, injuries suffered by football players. It may be that the nuance of the adjustment of the helmet is not a causative factor in the nature or severity of any injuries received by a football player. However, it has been alleged, by some attorneys on behalf of injured football players, that a failure of a team to ensure that the helmet is fit on the players in a manner consistent with the manufacturer's recommendations for that helmet, has been a causative factor of injuries or the severity of injuries received by football players who are hurt. Accordingly, it is in the interest of all parties to see, to the extent practical, that helmets are sized and adjusted most appropriately for each individual football player given the current environmental, temperature, and other conditions.

Accordingly, there is a need for a quick, efficient and simple system by which to appropriately judge whether or not the adjustment of a football helmet is appropriate for an individual on a given day and a given temperature and air pressure condition. The system must be quick and efficient or it will not be used since a burdensome system could not be used by staffs of limited means on a regular basis.

SUMMARY OF THE INVENTION

The present invention is summarized in that a card is provided that may be used to quickly and efficiently judge the size adjustment of football helmets. The card is sized and shaped so that it may be placed in two orientations inside of the face mask of the football helmet and judged against the location of the helmet in relation to the wearer's face. In one orientation, with the plane of the card generally parallel to the plane of the wearer's face, the card is used to judge the inflation at the top of the helmet relative to an indicia on the wearer's head, the indicia being typically the wearer's eyebrows. With the card in a second orientation, i.e. with the plane of the card perpendicular to the plane of the wearer's face, that same card may be used to check the lateral adjustment of the helmet to ensure that the correct spacing occurs between the wearer's face and the face mask.

It is thus an object of the present invention to provide a quick, efficient and convenient system for rapidly judging whether or not a football helmet has been aligned properly.

It is a feature of the present invention in that it uses a card which can be used to check the two most important adjustments of the helmet rapidly and without the need for other equipment or measures. It is also a feature of the present invention that the card can be made relatively durable and waterproof so that it can be retained by the football staff in sufficient numbers to ensure that the adjustment cards are always handy and conveniently accessible on a day-to-day basis.

It is an advantage of the present invention that it makes possible, without undue administrative burden or support, a relatively frequent check of the adjustment of football helmets to ensure, to the maximum extent practical, that the helmets are provided with the proper adjustments as recommended by the manufacturer of the helmet.

Other objects, advantages and features of the present invention will become apparent from the following specification when taken in conjunction with the accompanying drawings.

DETAILED DESCRIPTION OF THE INVENTION

Figure 1:
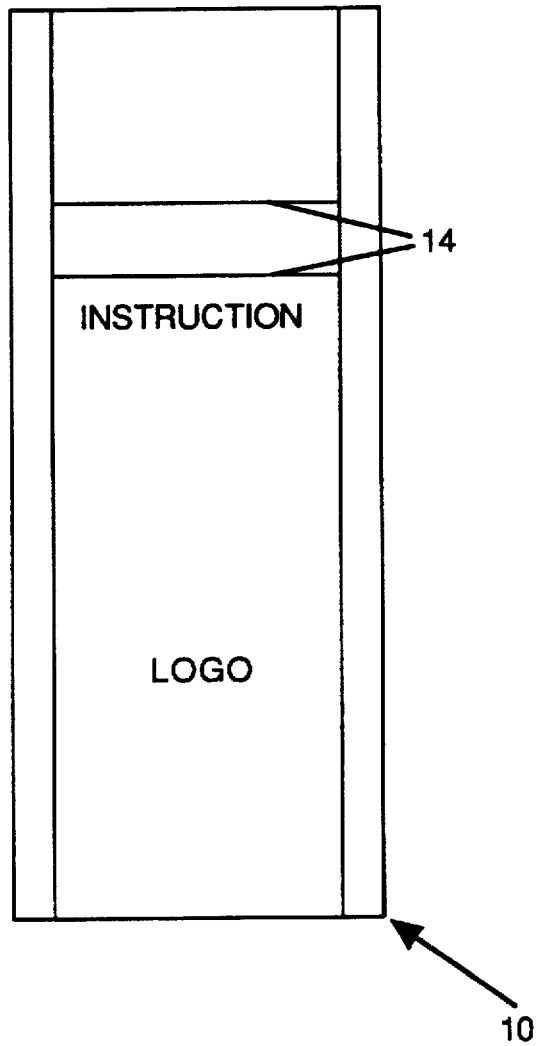
FIG. 1 is a plan elevational view of a card for use within the present invention.

Shown in FIG. 1 is the football helmet sizing card for use within the present invention. The card is made of a stiff paperboard blank approximately 5 to 7 inches in length. The card blank is laminated on both its faces with thermoplastic laminations which are heat sealed along the lateral edges of the card blank. The laminated edges are indicated at 12 on the card 10 of FIG. 1. The size of the completed card, i.e. including both the card blank and the lamination is important. In particular, it is specifically envisioned that the entire width of the card, including both the paperboard card blank and the laminated edges 12 corresponds approximately to the distance recommended by the manufacturer between the nose of the football player and the face mask of the helmet. Currently, most manufacturers recommend that this distance be approximately 2 inches. In length, the card is long enough in its longitudinal dimension, so that it may be held by hand and inserted underneath a football face mask for measuring vertical adjustment. In general, a card of 5 to 7 inches in length is found satisfactory.

Laterally across the card are at least two horizontal lines or other marking indicia, indicated at 14 in FIG. 1. The horizontal lines serve as vertical positioning indicia so as to facilitate the vertical positioning of the helmet on the football player relative to landmarks on the face of the wearer. The horizontal lines 14 are oriented on the card at a distance of between 1 and 1.5 inches distant from the top of the card 10 when the landmark on the face of the user is, as is preferred, the wearer's eyebrows. The lines 16 may be simple horizontal lines across the card, or can be any other form of marking or indicia which indicate a position on the card approximately equal to 1 to 1.5 inches vertically separated from the top of the card 10.

In thickness, the card 10 should be sized so as to be equal in thickness to a typical laminated card, such as a driver's license or other plastic laminated card stock item. The card should preferably be brightly colored, so that it can be easily found and used. The card may or may not have one or more holes or other fastening means provided in it so it can be dangled from a string or other strap attached to a member of the football equipment team.

Figure 2:
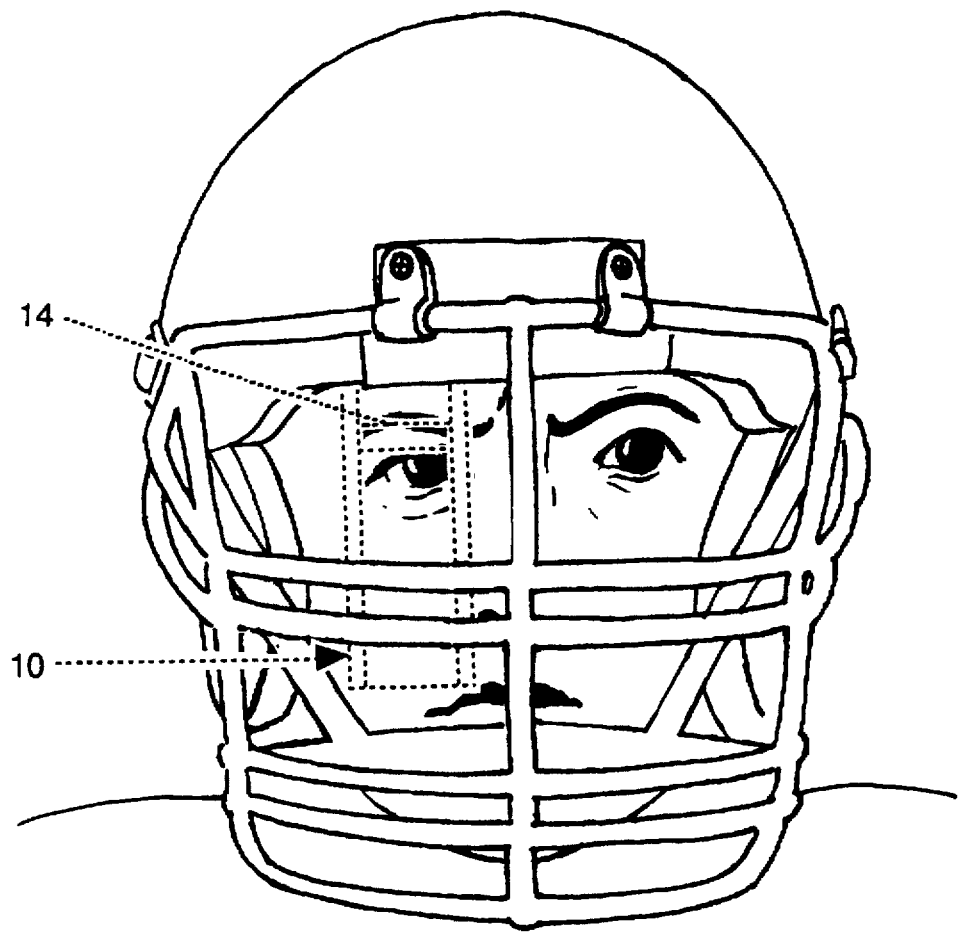
FIG. 2 is a front elevational view of a football helmet wearer together with the card of the present invention being used to check the adjustment of the wearer's football helmet, in a first orientation.

In its operation, the football helmet card fitting card 10 is used to provide a proper spacing and adjustment of the air inflatable bladder on a football player's head. The fitting card 10 is designed to be used on a daily or weekly basis to permit rapid and efficient adjustment of the proper spacing and sizing or a football player's helmet. In its operation, the card is first used to check the vertical adjustment of the helmet. The card is held by its lower end, and placed up underneath the player's face mask with its planar surface parallel to the plane of the wearer's head. This is generally illustrated in FIG. 2, where the card is shown in a dashed or broken line representation to indicate where it is placed on the player. The top of the card is brought into contact with the surface of the football helmet above the player's eyes, here referred to as the brim of the helmet. Then, the use of the card can then view quickly and efficiently whether or not the adjustment of the air bladder on the top of the player's helmet is properly made. If the player's eyebrows align with the eyebrow alignment indicia, i.e. the horizontal lines 14, carried on the card, then the helmet is properly adjusted vertically. If the player's eyebrows appear above or below the horizontal lines on the card, then the brim of the helmet is too low or too high because there is either too little or too much air in the bladder at the top of the helmet. Adjustment can then be appropriately made.

Figure 3:
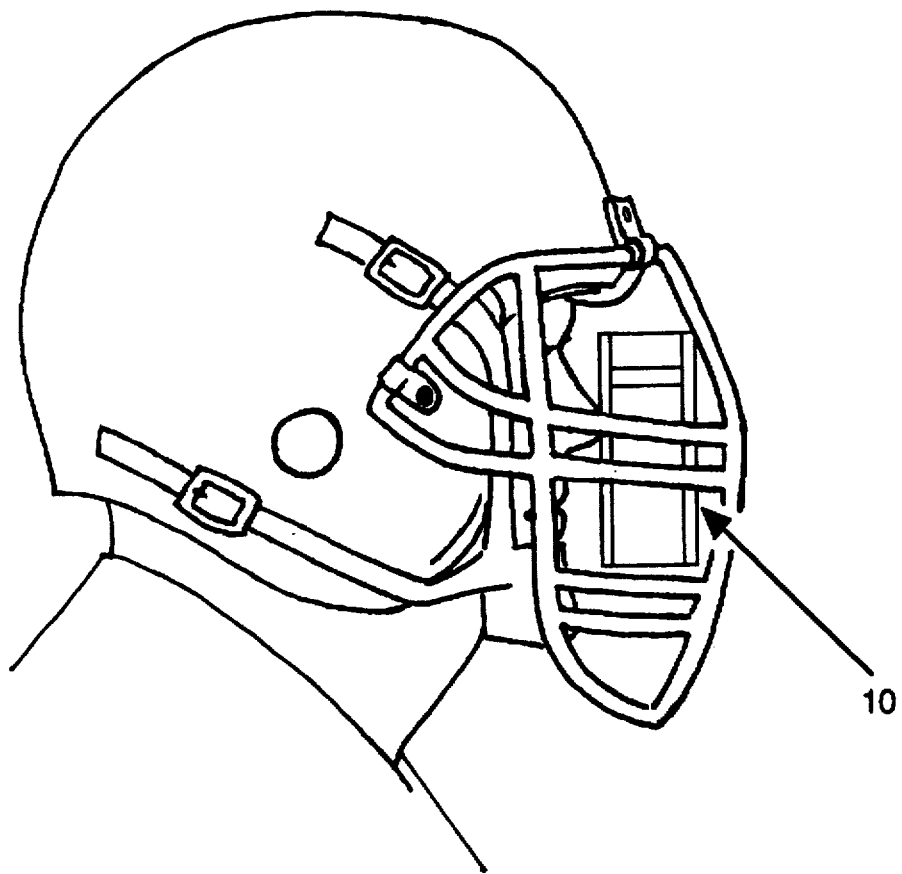
FIG. 3 is a side elevational view of a football player showing the use of the card of the present invention being used to test the adjustment of the football helmet in a second orientation.

To assess proper face mask clearance, the card is then turned 90°, to the orientation illustrated in FIG. 3. It is for reason of this adjustment that the width of the card is specified to correspond to the distance recommended by the manufacturer for the nose to face mask spacing. The card, in its lateral orientation, is placed between the nose of the player and the face mask so that that spacing can be judged relative to the width of the card. If the card touches the nose and the face mask without binding or constricting, the face mask is properly adjusted. If there is a gap on either side between the card and either the nose or the face mask, air pressure needs to be added to the lateral bladder on the helmet. If there is insufficient room for the card between the nose and the helmet, air needs to be removed from the rear bladder of the helmet, or a different face mask needs to be attached to the helmet.

After that the card may further be used to judge whether the jaw pads are snug to the sides of the face. This can simply be done by inserting the card between the jaw pads and the face of the wearer. If the card fits snugly in that space, the adjustment is proper. If the card cannot be inserted in the space the pads are probably too tight and if the card fits loosely in the space then they are not tight enough.

The observation which gave rise to the development of the present invention was based upon evaluation of helmet fitting practices by scholastic athletes. This evaluation indicated that improper football helmet sizing is common at least at some levels of the sport.

In one study, 422 high school football players selected from 10 high schools in Wisconsin had the fit of their helmets assayed by certified athletic trainers with the consent of the coaches of each of the teams. Helmet fit was assessed using the 7 specific criteria selected from the standardized helmet fitting guidelines of the manufacturers of the helmets. The criteria included: 1) clearance above the eyebrows, 2) minimal posterior/anterior movement with pressure, 3) clearance from nose to face mask, 4) cheek pads snug to head, 5) adequate coverage of the posterior cranium, 6) center chin strap, and 7) ear hole alignment. Each of the criteria was visually and manually inspected while the helmet was worn by the player. The results of this study indicated that there were approximately 1½ fitting errors per helmet and only 19% of the helmets inspected had no fitting errors. The most common fitting error, occurring in more than half of the helmets (52.6%) was inadequate clearance between the eyebrows and the front of the helmet. Based on the criteria selected, nearly half of the players evaluated had helmets that would require significant adjustments (at least 2 or more fitting errors) to insure a correct fit and adjustment.

In a second study, 1,671 high school football players from 33 randomly selected public high schools in the state of Wisconsin were chosen for a study. The helmets were evaluated for correct fit by 13 certified athletic trainers during football practice, with the consent of the head coach of each of the football teams. Helmet fit was assessed by examining 7 specific standardized criteria from the recommended helmet fitting guidelines published by the manufacturers of the helmet. The criteria selected for examination included: 1) clearance between the eyebrows and the helmet, 2) clearance from nose to face mask, 3) chin strap alignment and tightness, 4) jaw pad snugness, 5) ear hole alignment, 6) coverage of the posterior of the head, and 7) minimal anterior/posterior movement with pressure. Each criteria was visually and manually inspected while the helmet was worn by the player in question. The fit of the helmet was evaluated both with respect to the correctness of the fit and also with the individual who had fitted the helmet (i.e., coach, player, or others). It was determined from this study that the average error in helmet fit was between 2.11 and 2.18 errors per helmet fit. The most common error in the helmets fitted either by the players or the coaches was an adjustment of the clearance between the eyebrows and the top of the helmet. Almost half of the helmets (45% of those fitted by coaches and 41% of those fitted by others) were improperly adjusted by this criteria.

The results of these studies demonstrated a dramatic need to have an efficient and reliable system to judge helmet fit and alignment. The card and system of the present invention provide such a system by making a device, i.e., the card, which can be manufactured and distributed at modest cost thereby making it widely available. When such cards are widely available and readily accessible, it becomes a convenient and easy manner to periodically check the fit of helmets and make sure the proper alignment of the helmets on a team over the course of the season is maintained.

We claim:

1. A device for the adjustment of the size of an adjustable football helmet having a face mask on a wearer, the device comprising a planar card of a generally rectangular shape, the card being elongated in a first direction between two ends and having a lateral width in a second direction perpendicular to the first direction;

indicia placed on the card extending across the lateral width of the card and located on the card an appropriate distance from a one of the ends of the card so that when the card is placed inside the facemask of the helmet with said one end abutting the brim of the helmet, the indicia will indicate where a physical reference point of the face of the wearer should be located relative to the brim of the helmet; and the lateral width of the card being sized so as to correspond to the recommended distance between the facemask of the wearer and the nose of the wearer, so that the card may be conveniently used to size the helmet in position on the wearer.

2. A device as claimed in claim 1 wherein the indicia comprises a pair of lines extending across the lateral width of the card which indicate the upper and lower range of acceptable location of the wearer's face relative to the helmet.

3. A device as claimed in claim 2 wherein the indicia further comprises directions to the user in the use of the device.

4. A device as claimed in claim 1 wherein the physical reference point on the face of the wearer is the wearer's eyebrows.

5. A device as claimed in claim 1 wherein the card is sized in thickness so as to correspond to the distance between jaw pads on the helmet and the wearer.

6. A device for use in the adjustment of football helmets with adjustable air bladders and a facemask, the device comprising a card formed of a rectangular card blank and a protective lamination;

the rectangular card blank of paperboard stock being elongated in a longitudinal direction between two ends and having a lateral width in a lateral direction perpendicular to the longitudinal direction;

the protective lamination surrounding the card blank from moisture damage and extending beyond the lateral width of the card blank;

the card blank having formed thereon upper and lower lateral lines extending across the lateral width of the card blank spaced from a one of the two ends thereof, the lines being placed on the card blank in such a location when said one end of the card is placed against the brim of the helmet, the upper and lower lines indicate the recommended upper and lower location of the eyebrows of the wearer relative to the helmet; and the lateral width of the card, including both the card stock and the lamination, being such as to correspond to the recommended distance between the nose of the wearer and the facemask.

7. A method of analyzing the fit of a football helmet with adjustable air bladders and a face mask, the method comprising the steps of placing a planar card which is elongated in a first direction and which has a lateral width under the facemask of the player with the elongation of the card oriented vertically and with the upper end of the card placed against the brim of the helmet;

comparing the relative location of indicia on the card relative to a physical landmark on the face of the wearer of the helmet to determine the vertical adjustment of the helmet relative to the wearer;

placing the card with its lateral width oriented extending between the nose of the wearer and the facemask; and comparing the clearance between the card, the nose of the wearer and the facemask to determine the lateral adjustment of the helmet relative to the wearer.

8. A method as claimed in claim 7 wherein the physical landmark on the face of the wearer is the wearer's eyebrows.

* * * * *